(12) United States Patent
DesForge et al.

(10) Patent No.: US 8,328,173 B1
(45) Date of Patent: Dec. 11, 2012

(54) SUPPORT STAND SYSTEM FOR AUTOMOBILE PARTS

(76) Inventors: Steven L. DesForge, Eau Claire, WI (US); Linda DesForge, Eau Claire, WI (US)

( * ) Notice: Subject to any disclaimer, the term of this patent is extended or adjusted under 35 U.S.C. 154(b) by 237 days.

(21) Appl. No.: 12/874,139

(22) Filed: Sep. 1, 2010

(51) Int. Cl.
*B23Q 1/64* (2006.01)

(52) U.S. Cl. .......... 269/71; 269/17; 248/176.1; 254/2 B; 254/8 R

(58) Field of Classification Search .............. 269/71, 269/17, 60, 55, 900; 254/2 B, 2 R, 8 R, 134; 29/281.1, 281.5; 414/490; 280/47.24; 248/127, 248/125.1, 176.1
See application file for complete search history.

(56) References Cited

U.S. PATENT DOCUMENTS

| | | | |
|---|---|---|---|
| 2,827,690 A | 3/1958 | Brown | |
| 4,183,511 A * | 1/1980 | Marek | 269/17 |
| 4,530,492 A * | 7/1985 | Bork | 269/17 |
| D303,031 S | 8/1989 | Ellis | |
| 5,141,211 A | 8/1992 | Adams, Jr. | |
| 5,296,030 A | 3/1994 | Young | |
| 5,660,637 A | 8/1997 | Dodge | |
| 5,707,450 A | 1/1998 | Thompson | |
| D399,111 S * | 10/1998 | Budesa | D8/71 |
| 5,915,742 A * | 6/1999 | Hung | 29/281.5 |
| 6,024,348 A * | 2/2000 | Ventura et al. | 269/17 |
| 6,173,947 B1 * | 1/2001 | Johnson | 269/17 |
| 6,409,128 B1 * | 6/2002 | Deshler | 248/127 |
| 6,729,632 B2 | 5/2004 | Ferrigan | |
| 7,445,184 B1 * | 11/2008 | Johnson | 248/176.1 |
| 7,448,606 B1 * | 11/2008 | Johnson | 269/17 |
| 7,448,608 B2 * | 11/2008 | Radermacher | 269/139 |
| 8,066,267 B2 * | 11/2011 | Schaerer | 269/17 |

* cited by examiner

*Primary Examiner* — Lee D Wilson

(57) ABSTRACT

A support stand system for supporting parts of automobiles for repair work or painting purposes featuring a main base and one or more additional components including a fender stand for supporting fenders, a bumper stand for supporting bumpers, a paint tray, a door stand for supporting doors and hoods, and a sawhorse. The components are interchangeable. Securing devices such as clamp brackets can be used with any of the components.

16 Claims, 15 Drawing Sheets

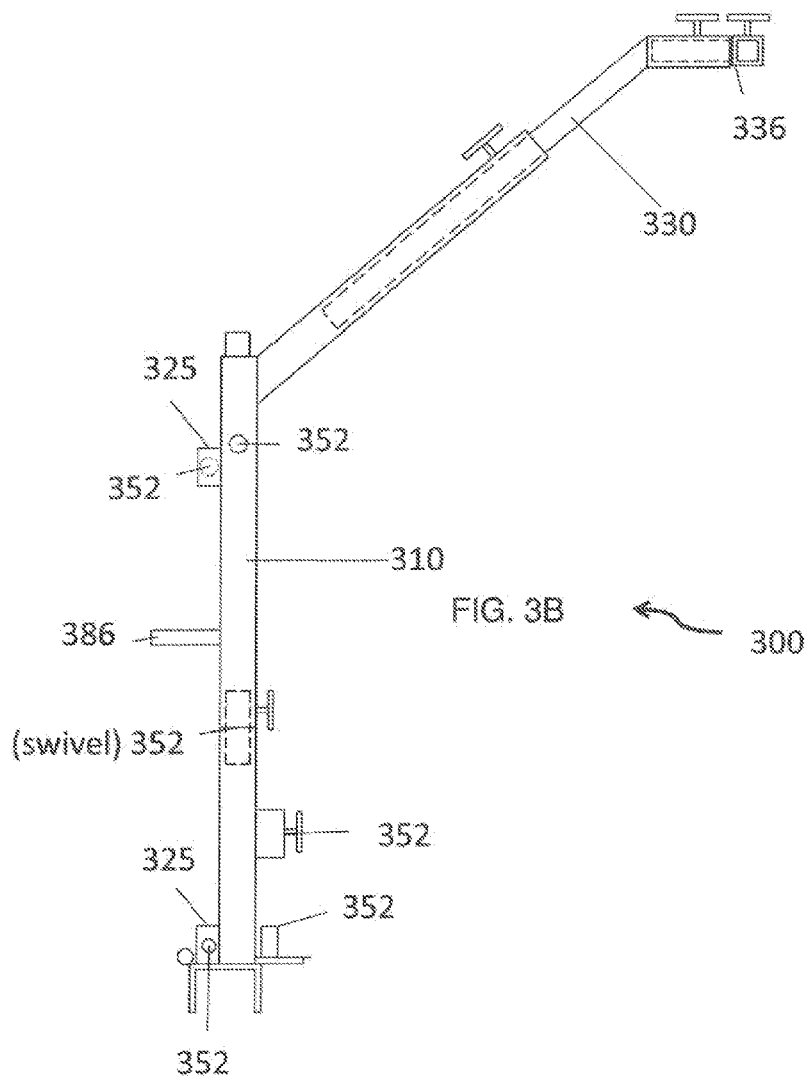

SUPPORT STAND SYSTEM FOR AUTOMOBILE PARTS

FIELD OF THE INVENTION

The present invention is directed to a multifunctional stand system with a plurality of attachments for supporting parts of automobiles for repair work and/or painting purposes.

BACKGROUND OF THE INVENTION

Repairing automobile components can require a large amount of bulky equipment. The present invention features a support stand system with a plurality of attachments, wherein the support stand system can support a large variety of automobile components for repair work and/or other purposes including painting. The support stand system has a main base with a plurality of wheels that allow the system to be easily moved from place to place.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a support stand system with a plurality of attachments, wherein the support stand system can support a large variety of automobile components for repair work and/or other purposes including painting. In some embodiments, the support stand system comprises a generally H-shaped main base comprising a first half base and a second half base connected by a center shaft, the first half base and second half base being generally parallel to each other and perpendicular to the center shaft, the main base mounted atop a plurality of wheels.

The system further comprises one or more of the following: (a) a bumper stand comprising a first vertical support shaft having a first end and a second end, the first vertical support shaft is removably attached to the main base via a first mounting clamp disposed on the second end; a T bar removably attached to the first end of the first vertical support shaft via a first T bar brace; an extension bar disposed on the first vertical support bar extending from the first end such that the extension bar is at an angle with respect to the first vertical support shaft; a second vertical support shaft attached to the first vertical support shaft parallel to the first vertical support shaft via one or more bumper stand mounting clamps; a first swivel component disposed in the first vertical support shaft, the first swivel component allows the first vertical support shaft to rotate; a paint mounting clamp disposed on the first vertical support shaft, the paint mounting clamp is adapted to removably engage a paint tray; and a bumper arm removably attachable to the first vertical support shaft, a first end of the bumper arm curves away from the first vertical support shaft, wherein a clamp device is disposed on the first end of the bumper arm via a clamp device mount; (b) a fender stand comprising a first vertical arm having a first end and a second end, the first vertical arm is removably attached to the main base via a second mounting clamp disposed on the second end; a second vertical arm disposed on the first vertical arm parallel to the first vertical arm via one or more first arm clamps, wherein a first end of the second vertical arm extends above the first end of the first vertical arm; an extension bar disposed on the first end of the first vertical arm extending from the first end such that the extension bar is at an angle with respect to the first vertical arm; a paint mounting clamp disposed on the first vertical arm, the paint mounting clamp is adapted to removably engage a paint tray; and one or more removable fender arms removably attached to a fender arm mount disposed on the first vertical arm, wherein each fender arm has a mounting end that is adapted to engage the first end of the second vertical arm; and a handle disposed on the first vertical arm or the second vertical arm; (c) a door stand comprising a first vertical bar having a first end and a second end, the first vertical bar is removably attached to the main base via a third mounting clamp disposed on the second end; a paint mounting clamp disposed on the first vertical bar, the paint mounting clamp is adapted to removably engage a paint tray; a handle disposed on the first vertical bar; and a bearing mounting arm disposed on the first end of the first vertical bar; and (d) a paint tray comprising a paint pan; a mounting rod disposed on a first side of the paint pan, the mounting rod is adapted to engage a paint tray mounting component of the bumper stand, fender stand, and door stand; and a ring disposed on a second side of the paint pan.

In some embodiments, the wheels of the main base are caster wheels. In some embodiments, the main base is expandable. In some embodiments, the first half base comprises an outer bar and an inner bar that are both generally parallel to each other and generally perpendicular to the center shaft. In some embodiments, the second half base comprises an outer bar and an inner bar that are both generally parallel to each other and generally perpendicular to the center shaft.

In some embodiments, the first vertical support shaft of the bumper stand is adjustable in length. In some embodiments, the extension bar of the bumper stand is adjustable in length. In some embodiments, the support stand system further comprises a first pipe disposed on an outer end of the extension bar of the bumper stand. In some embodiments, the support stand system further comprises a second pipe disposed on the second vertical support shaft of the bumper stand, wherein the second pipe can swivel up and down.

In some embodiments, the first vertical arm of the fender stand is adjustable in length. In some embodiments, the support stand system further comprises a rotating arm disposed on an outer end of the extension bar of the fender stand. In some embodiments, the extension bar of the fender stand is pivotally attached to the first vertical arm via a first pivot component.

In some embodiments, the first vertical bar of the door stand is adjustable in length. In some embodiments, the support stand system further comprises a release handle for bearings disposed on a first end of the bearing mounting arm. In some embodiments, the support stand system further comprises a rotation bearing disposed on a second end of the bearing mounting arm. In some embodiments, the support stand system further comprises a secondary arm with a door and hood mount disposed on the rotation bearing.

BRIEF DESCRIPTION OF THE DRAWINGS

FIG. 3B is a third side view of the fender stand of FIG. 3.

DESCRIPTION OF PREFERRED EMBODIMENTS

Referring now to FIGS. 1-7, the present invention features a support stand system for supporting parts of automobiles for repair work and/or painting purposes. The support stand system may allow a user to support and manipulate heavy automobile components that have been detached from the vehicle. For example, the support stand system may allow for the repair and/or painting of a door, a fender, a bumper, the like, or a combination thereof.

Base

Figure 1:
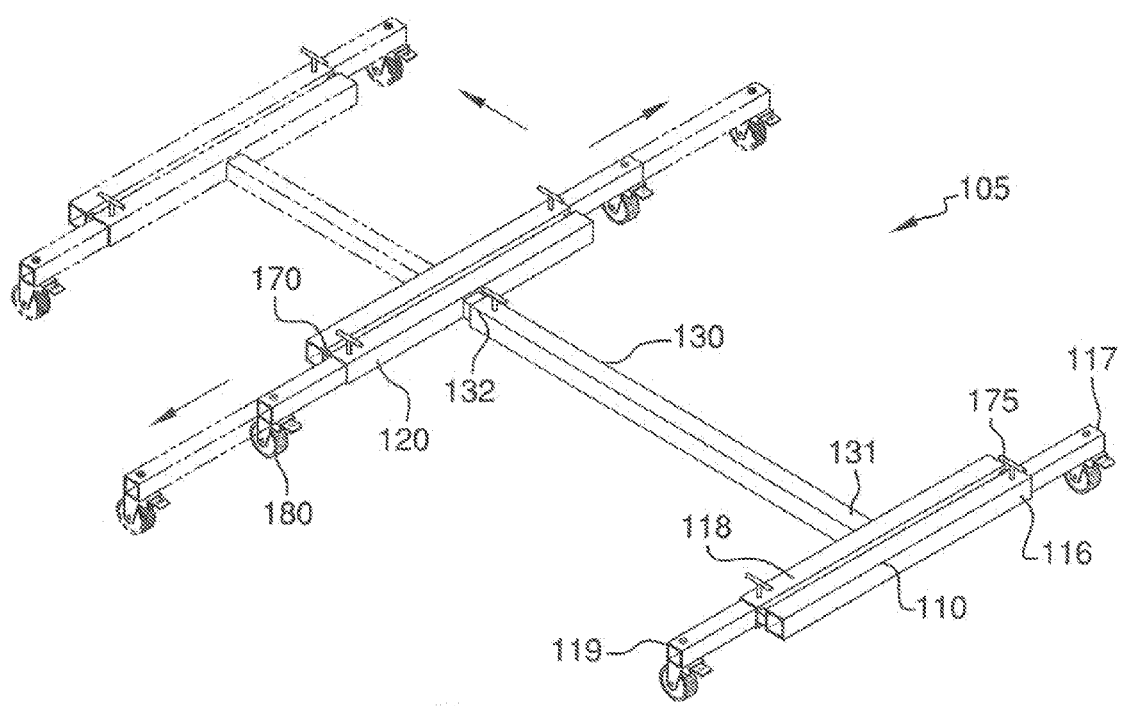
FIG. 1 is a perspective view of the main base of the support stand system of the present invention.
Figure 1A:
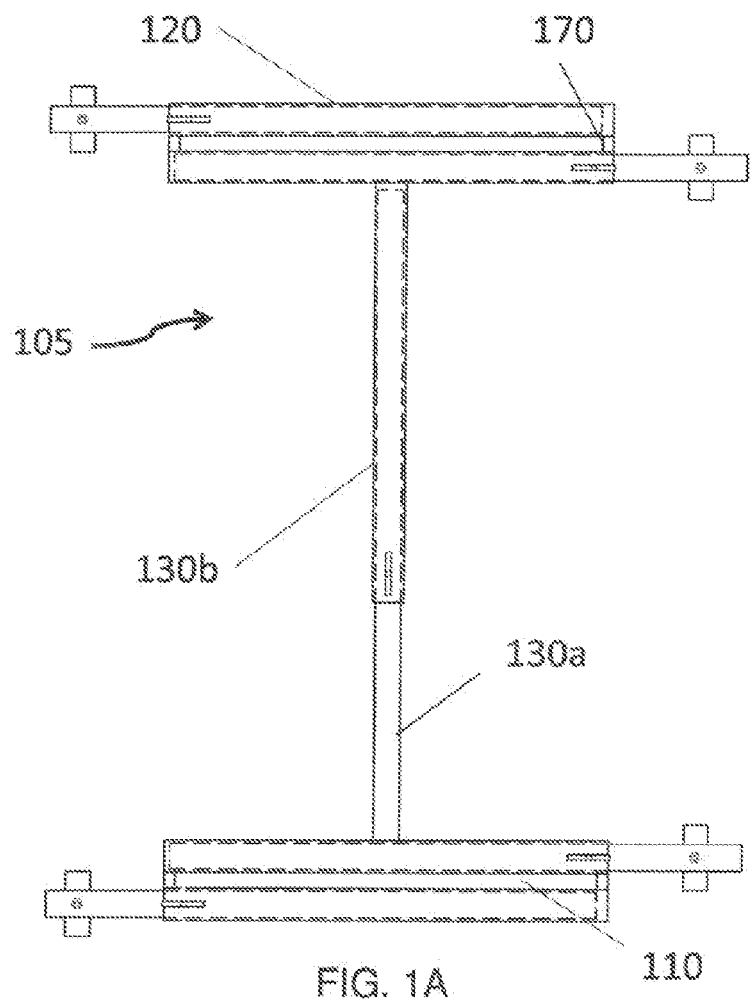
FIG. 1A is a top view of the main base of FIG. 1.
Figure 1B:
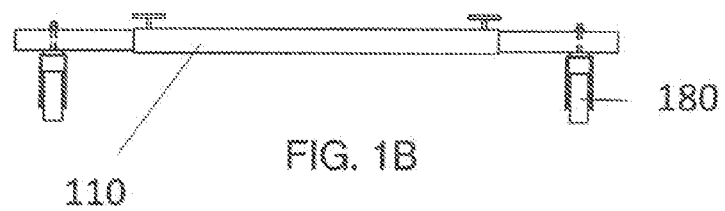
FIG. 1B is a side view of the main base of FIG. 1.

Referring now to FIG. 1, FIG. 1A, and FIG. 1B, the support stand system comprises a generally H-shaped main base 105 that helps support other components of the support stand system and/or components of the automobile. The main base 105 comprises a first half base 110 and a second half base 120 connected by a center shaft 130. The first half base 110 and second half base 120 are generally perpendicular to the center shaft 130. The center shaft 130 has a first end 131 connected to the first base 110 and a second end 132 connected to the second base 120. The main base 105 is positioned generally horizontally to the ground and raised a certain distance above the ground via a plurality of wheels 180. In some embodiments, the wheels 140 are caster (swivel) wheels. In some embodiments, the wheels 140 may be locked.

In some embodiments, the main base 105 is between about 2 to 4 inches above the ground. In some embodiments, the main base 105 is between about 4 to 6 inches above the ground. In some embodiments, the main base 105 is between about 6 to 8 inches above the ground. In some embodiments, the main base 105 is move than about 8 inches above the ground.

The main base 105 may be of various lengths and may be expandable. For example, in some embodiments, the center shaft 130 comprises a first telescopic component 130a telescopically received in a second telescopic component 130b. Telescopic components and means of expanding and contracting such poles are well known to one of ordinary skill in the art. In some embodiments, a locking mechanism secures the center shaft 130 (e.g., telescopic components 130a, 130b) at a fixed length.

In some embodiments, the center shaft 130 is between about 36 to 42 inches in length as measured from the first end 131 to the second end 132. In some embodiments, the center shaft 130 is between about 42 to 48 inches in length as measured from the first end 131 to the second end 132. In some embodiments, the center shaft 130 is between about 48 to 60 inches in length as measured from the first end 131 to the second end 132. In some embodiments, the center shaft 130 is between about 60 to 72 inches in length. In some embodiments, the center shaft 130 is more than about 72 inches in length.

The first half base 110 comprises an outer bar 116 and an inner bar 118 that are both generally parallel to each other and generally perpendicular to the center shaft 130. The first end 131 of the center shaft 130 is attached (e.g., perpendicularly) to we inner bar 118 of the first half base 110. The outer bar 116 is attached to the inner bar 118 on the side opposite the center shaft 130. In some embodiments, the outer bar 116 is directly attached to the inner bar 118. In some embodiments, the outer bar 116 and the inner bar 118 are attached to each other via one or more spacers 170. In some embodiments, the outer bar 116 and the inner bar 118 are staggered, for example the first end 119 of the inner bar 118 extends past the first end of the outer bar 116, and the second end 117 of the outer bar 116 extends past the second end of the inner bar 118. In some embodiments, the inner bar 118 and outer bar 116 are expandable (e.g., comprise telescopic components). The outer bar 116 and inner bar 118 may be of various lengths. In some embodiments, a locking mechanism secures the inner bar 118 and/or outer bar 116 at a fixed length (e.g., a T-handle 175).

The second half base 120 comprises an outer bar and an inner bar that are both generally parallel to each other and generally perpendicular to the center shaft 130. The second end 132 of the center shaft 130 is attached (e.g., perpendicularly) to the inner bar of the second half base 120. The outer bar is attached to the inner bar on the side opposite the center shaft 130. In some embodiments, the outer bar is directly attached to the inner bar. In some embodiments, the outer bar and the inner bar are attached to each other via one or more spacers 170. In some embodiments, the outer bar and the inner bar are staggered, for example the first end of the inner bar extends past the first end of the outer bar, and the second end of the outer bar extends past the second end of the inner bar. In some embodiments, the inner bar 18 and outer bar are expandable (e.g., comprise telescopic components). The outer bar and inner bar may be of various lengths. In some embodiments, a locking mechanism secures the inner bar and/or outer bar at a fixed length (e.g., a T-handle 175).

In some embodiments, the inner bar 118 and/or the outer bar 116 are between about 18 to 24 inches in length as measured from the first end to the second end. In some embodiments, the inner bar 118 and/or outer bar 116 are between about 24 to 36 inches in length as measured from the first end to the second end. In some embodiments, the inner bar 118 and/or outer bar 116 are between about 36 to 48 inches in length as measured from the first end to the second end. In some embodiments, the inner bar 118 and/or the outer bar 116 are between about 48 to 60 inches in length. In some embodiments, the inner bar 118 and/or the outer bar 116 are more than about 60 inches in length.

The support stand system of the present invention can be configured according to a user's needs. For example, the support stand system comprises one or more separate attachment stands that may be used for holding fenders, a door, hood, bumper, or small parts. The separate attachment stands may include but is not limited to a paint tray 400, a fender stand 300, a bumper stand 200, and/or a hood and door stand 500. The attachment stands are generally attached to the main base 105.

Bumper Stand

Figure 2:
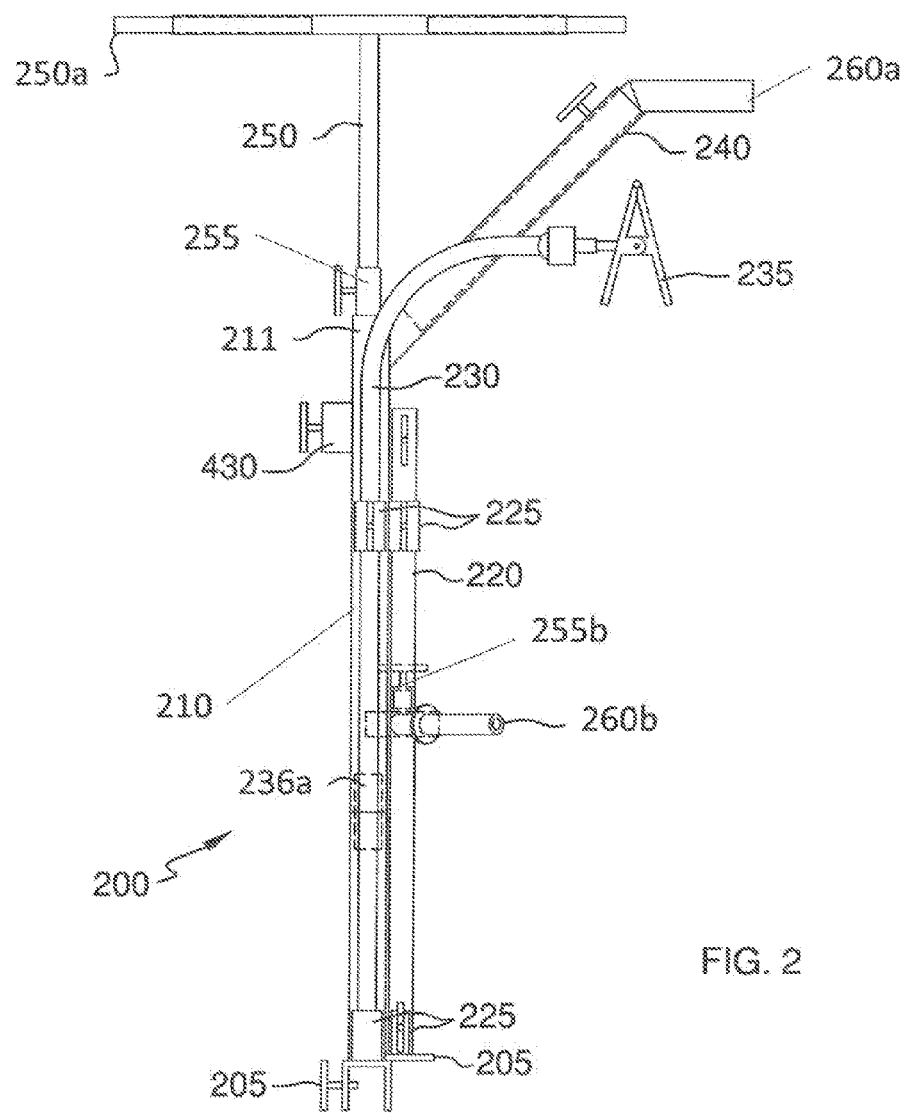
FIG. 2 is a first side view of the bumper stand of the support stand system of the present invention.
Figure 2A:
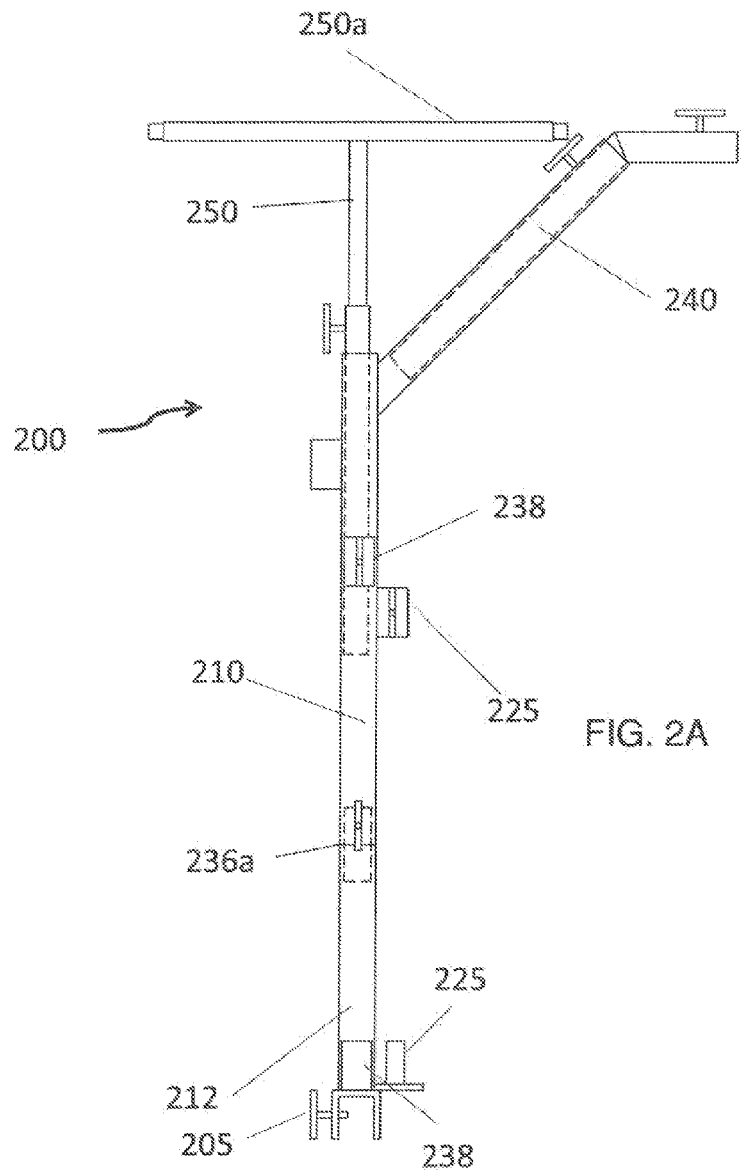
FIG. 2A is a second side view of the bumper stand of FIG. 2 without the second vertical shaft.
Figure 2B:
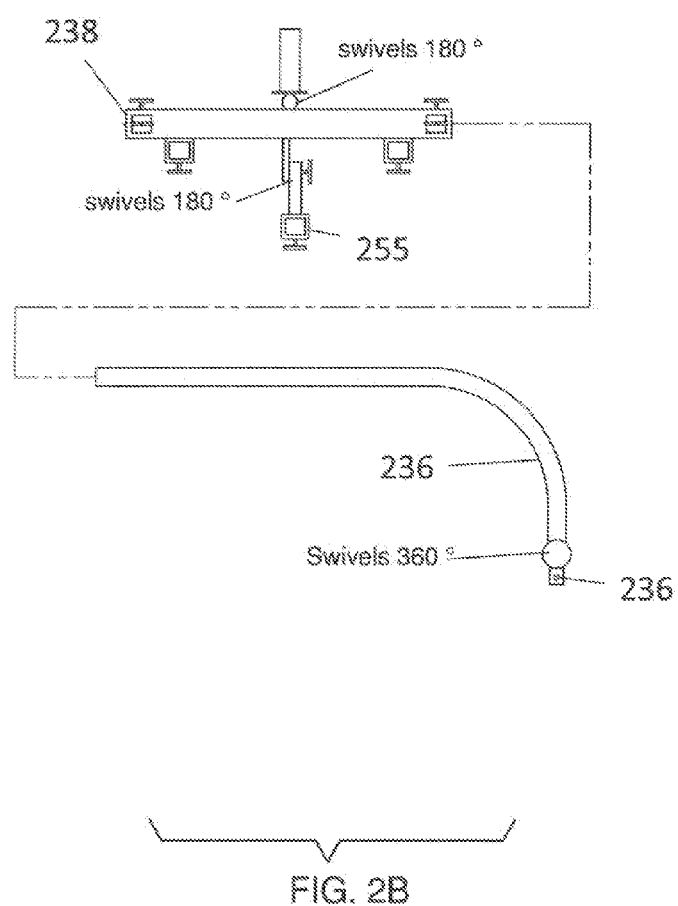
FIG. 2B is an exploded view of accessory components of the bumper stand of FIG. 2.

Referring now to FIG. 2, FIG. 2A, and FIG. 2B, in some embodiments, the support stand system of the present invention comprises a bumper stand 200 that is for attaching to the main base 105 via a first mounting clamp 205. The bumper stand 200 comprises a first vertical support shaft 210 having a first end 211 and a second end 212. The first mounting clamp 205 is disposed on the second end 212 of the first vertical support shaft 210. The first mounting clamp 205 is adapted to removably engage the center shaft 130 of the main base 130.

In some embodiments, the first vertical support shaft 210 is adjustable in length. For example, in some embodiments the first vertical support shaft 210 comprises telescopic poles. In some embodiments, a locking mechanism secures the telescopic poles of the first vertical support shaft 210 at a fixed length.

Disposed on the first end 211 of the first vertical support shaft 210 is a T bar 250. The T bar 250 is attached to the first vertical support shaft 210 such that the crossbar 250a of the T bar 250 is generally perpendicular to the first vertical support shaft 210. In some embodiments, the T bar 250 is used to support the bumper in an elevated state. The T bar 250 may be adjustable in length. In some embodiments, the T bar 250 is removably attachable to the first end 211 of the first vertical support shaft 210 via a first T bar brace 255.

In some embodiments, an extension bar 240 is disposed on the first vertical support bar 210 extending from the first end 211. The extension bar 240 is attached at an angle with respect to the first vertical support shaft 210 (see FIG. 2). The extension bar 240 may be adjustable in length. In some embodiments, a first pipe 260a is disposed on the outer end of the extension bar 240. The first pipe 260a is positioned so as to be generally perpendicular the first vertical support shaft 210. In some embodiments, the first pipe 260a is used to hold bumper arms 230.

Attached to the first vertical support shaft 210 (parallel to the first vertical support shaft 210) is a second vertical support shaft 220 having a first end and a second end. The second vertical support shaft 220 may be attached to the first vertical support shaft 210 via one or more bumper stand mounting clamps 225. For example, as shown in FIG. 2, bumper stand clamps are disposed on the second end of the first vertical support shaft 210 that engage the second end of the second vertical support shaft 220, and bumper stand clamps are disposed on the first vertical support shaft 210 that engage the first end of the second vertical support shaft 220.

A second pipe 260b may extend from the second vertical support shaft 220 (e.g., generally perpendicularly to the second vertical support shaft 220). The second pipe 260b may be used to hold bumper arms 230. In some embodiments, the second pipe 260b can swivel up and down (e.g., between about 0 to 180 degrees). In some embodiments, a second T bar brace 255b is disposed on the second vertical support shaft 220 for removably engaging the T bar 250.

In some embodiments, a first swivel component 236a is disposed in the first vertical support shaft 210. The first swivel component 236a allows the first vertical support shaft 210 to rotate (e.g., between about 0 to 360 degrees). In some embodiments, a paint mounting clamp 430 is disposed on the first vertical support shaft 210, wherein the paint mounting clamp 430 is adapted to removably engage the paint tray 400.

In some embodiments, a bumper arm 230 is removably attachable to the first vertical support shaft 210 and/or second vertical support shaft 220 (e.g., via bumper stand mounting clamps 225 or a bumper arm mount 238). In some embodiments, the first end of the bumper arm 230 curves away from the first vertical support shaft 210 (see FIG. 2). In some embodiments, a clamp device 235 is disposed (e.g., removably attached) on the first end of the arm 230 via a clamp device mount 236 (e.g., see FIG. 2B). In some embodiments, the bumper arm 230 is able to swivel or rotate. In some embodiments, the clamp device mount 236 allows the clamp device 235 to swivel. The bumper arm 230 can be attached to a variety of locations, for example one or more bumper arm mounts 238 disposed on the first vertical support shaft 210, bumper stand mounting clamps 225 on the first vertical support shaft 210 and/or second vertical support shaft 220.

As shown in FIG. 2B, the system of the present invention may further comprise a bumper arm attachment tree for attaching to the first vertical support shaft 210 and/or second vertical support shaft 220. The bumper arm attachment tree may comprise a plurality of bumper arm mounts 238 and a T bar mount 255.

Fender Stand

Referring now to FIG. 3, FIG. 3A, FIG. 3B, and FIG. 3C, the support stand system of the present invention further comprises a fender stand 300 that is for attaching to the main base 105 via a second mounting clamp 305. The fender stand 300 comprises a first vertical arm 310 having a first end and a second end. The second end of the first vertical arm 310 is attachable to the center shaft 130 of the main base 105 via the second mounting clamp 305.

A second vertical arm 320 is attachable (e.g., parallel to the first vertical arm 310) to the first vertical arm 310 via one or more first arm clamps 325. For example, one or more first arm clamps 325 may attach the second end of the second vertical arm 320 to the second end of the first vertical arm 310. One or more first arm clamps 325 may attach the middle of the second vertical arm 320 to the first end (or near the first end) of the first vertical arm 310. Generally, the first end of the second vertical arm 320 extends above the first end of the first vertical arm 310 (see FIG. 3). In some embodiments, the first vertical arm 310 is adjustable in length (e.g., the first vertical arm 310 comprises telescopic components).

Disposed on the first end of the first vertical arm 310 is an extension bar 330. The extension bar 330 is attached at an angle with respect to the first vertical arm 310 (see FIG. 3). The extension bar 330 may be used to hold the lower part of a fender, for example. In some embodiments, a rotating arm 336 is disposed on the outer end of the extension bar 330.

Disposed on the first end of the first vertical arm 310 (e.g., at or near the extension 330) is a paint mounting clamp 430. The paint mounting clamp 430 is adapted to removably engage the paint tray 400.

Figure 3:
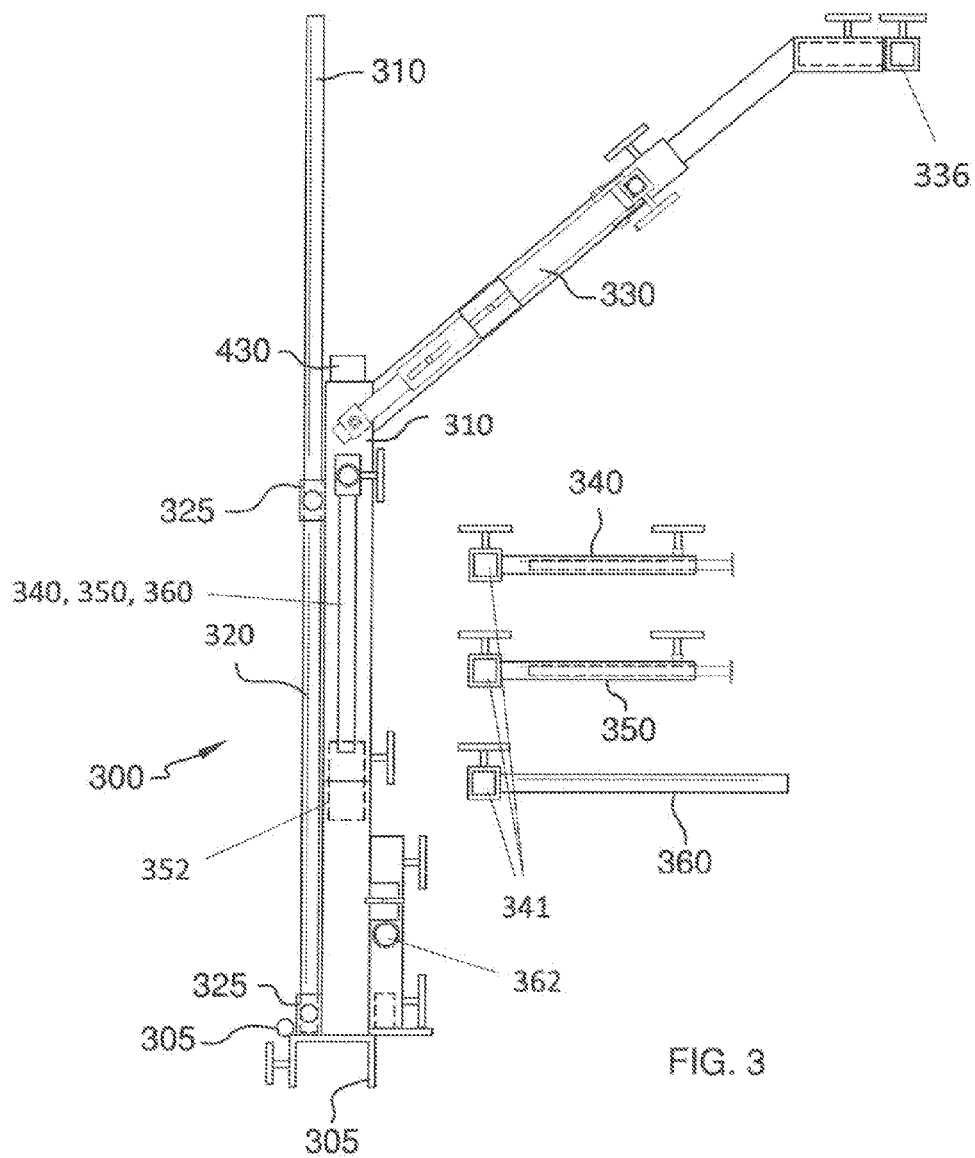
FIG. 3 is a first side view of the fender stand of the support stand system of the present invention.

The fender stand 300 further comprises one or more (e.g., four) removable fender arms 340, 350, 360. The fender arms 340, 350, 360 may be removably attached to a fender arm mount 352 disposed on the first vertical arm. In some embodiments, the fender arm mount 352 allows for swiveling. The fender arms 340, 350, 360 each have a mounting end 341 that is adapted to engage the first end of the second vertical arm 320. In some embodiments, a fender is rested on the outer end of the fender arm 340, 350, 360, e.g., opposite the mounting end 341. In some embodiments, the fender arms 340, 350, 360 can be removably attached to a rotating arm 362 disposed on the first vertical arm 310 at the second end. As shown in FIG. 3, the fender stand 300 may comprise a plurality of fender arms, for example one or more (e.g., four) 6 inch fender arms 340, one or more (e.g., two) 8 inch fender arms 350, and one or more (e.g., two) third fender arms 360.

Figure 3A:
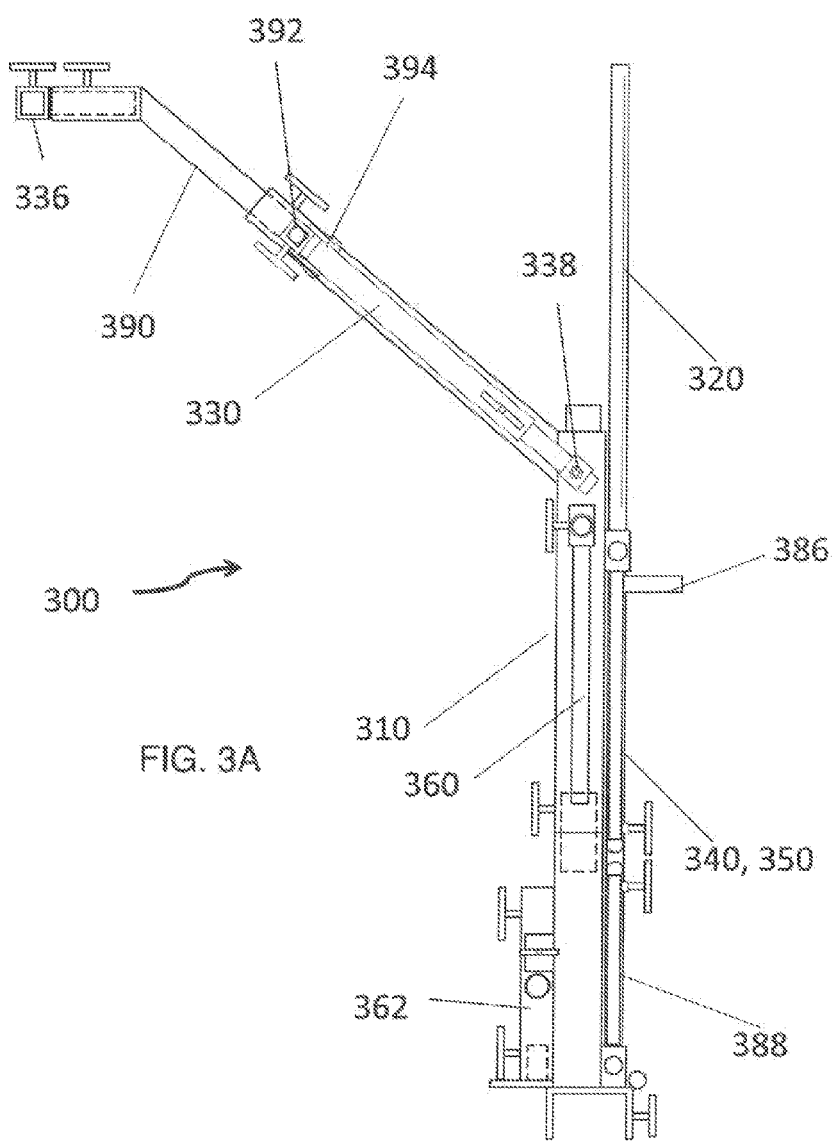
FIG. 3A is a second side view of the fender stand of FIG. 3.

As shown in FIG. 3A, in some embodiments, the extension bar 330 is pivotally attached to the first vertical arm 310 via a first pivot component 338. In some embodiments, a special part mount 388 is disposed on the second end of the second vertical arm 320. In some embodiments, a handle 386 is disposed on the second vertical arm 320. As shown in FIG. 3A, a mounting extension 390 is disposed on the outer end of the extension bar 330. The mounting extension 390 may attach to the extension bar 330 via an extension mount 392. In some embodiments, a swivel component 394 is disposed in the extension bar 330 near the extension mount 392.

Figure 3C:
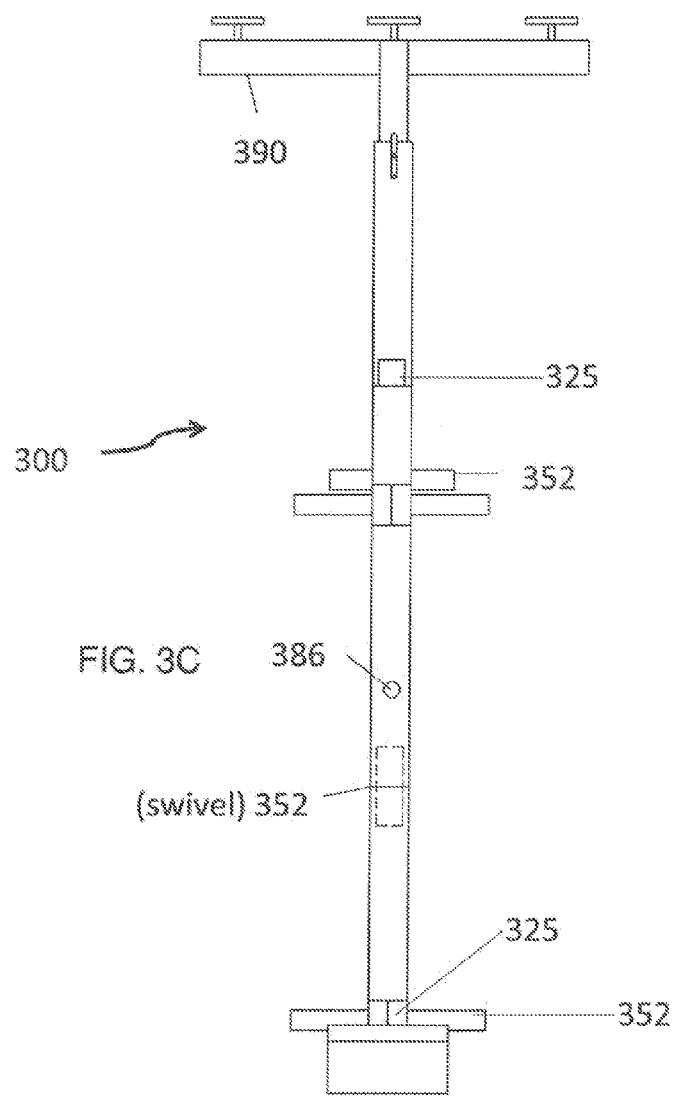
FIG. 3C is a front view of the fender stand of FIG. 3.

As shown in FIG. 3C, a mounting extension 390 may be disposed on the outer end of the extension bar 330. The mounting extension 390 may rotate, for example between about 0 to 360 degrees.

Door Stand

Figure 4:
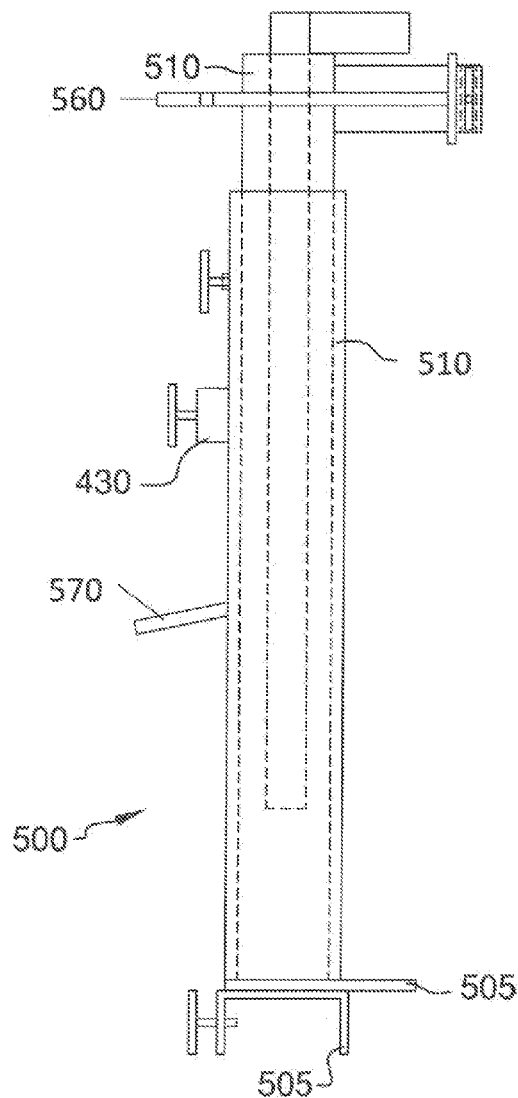
FIG. 4 is a first side view of the hood and door stand of the support stand system of the present invention.
Figure 4A:
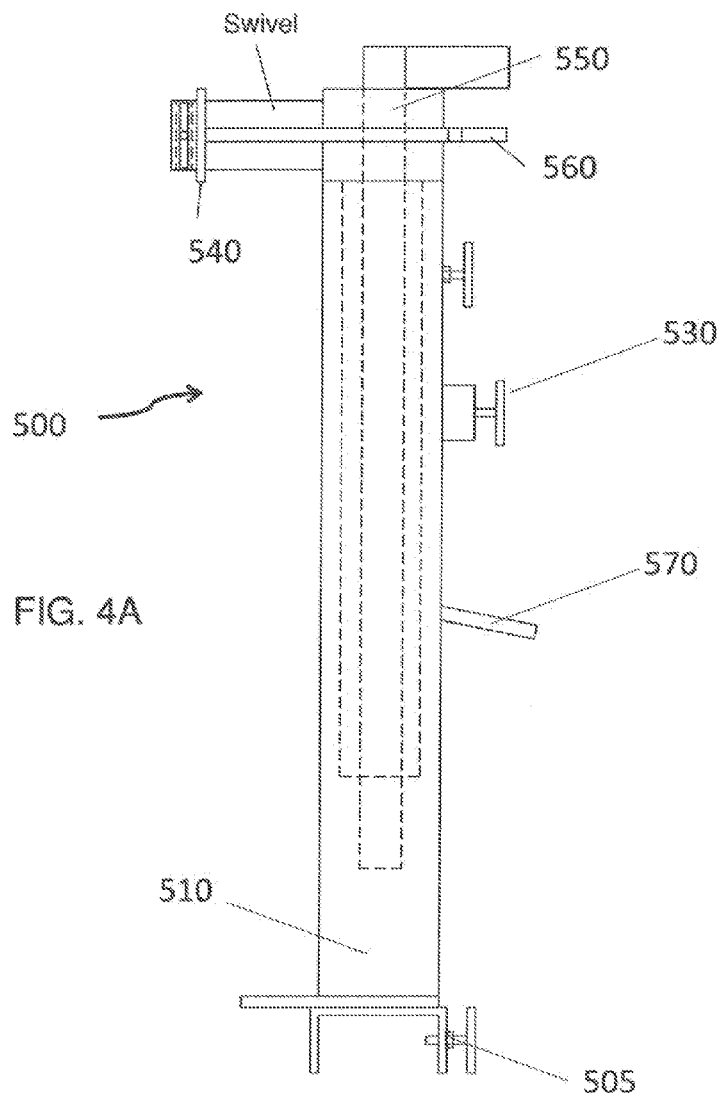
FIG. 4A is a second side view of the hood and door stand of FIG. 4.
Figure 4B:
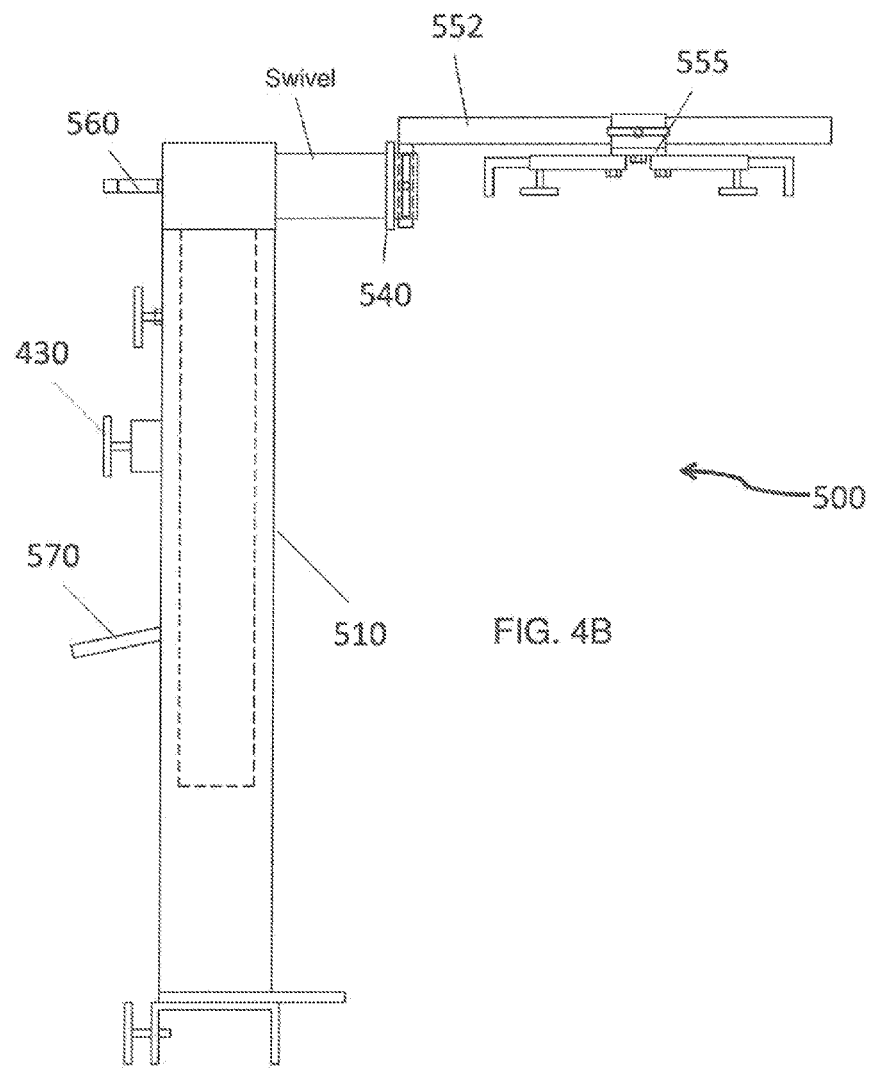
FIG. 4B is a third side view of the hood and door stand of FIG. 4.

Referring now to FIG. 4, FIG. 4A, and FIG. 4B, the support stand system of the present invention further comprises a door stand 500 (e.g., hood and door stand) that is for attaching to the main base 105 via a third mounting clamp 505. The door stand 500 comprises a first vertical bar 510 having a first end and a second end. The second end of the first vertical bar 510 is attachable to the center shaft 130 of the main base 105 via the third mounting clamp 505. In some embodiments, the first vertical bar 510 is adjustable in length (e.g., comprising telescopic components).

A paint tray-mounting component 430 for attaching a paint tray 400 is disposed on the first vertical bar 510 of the door stand 500. In some embodiments, a handle 570 is disposed on the first vertical shaft 510.

A bearing mounting arm 550 is disposed on the first end of the first vertical bar 510. Disposed on the first end of the bearing mounting arm 550 is a release handle 560 for bearings. Disposed on the second end of the bearing mounting arm 550 is a rotation bearing 540. Disposed on the rotation bearing 540 is a secondary arm 552 with a door and hood mount 555.

Paint Tray

Figure 5:
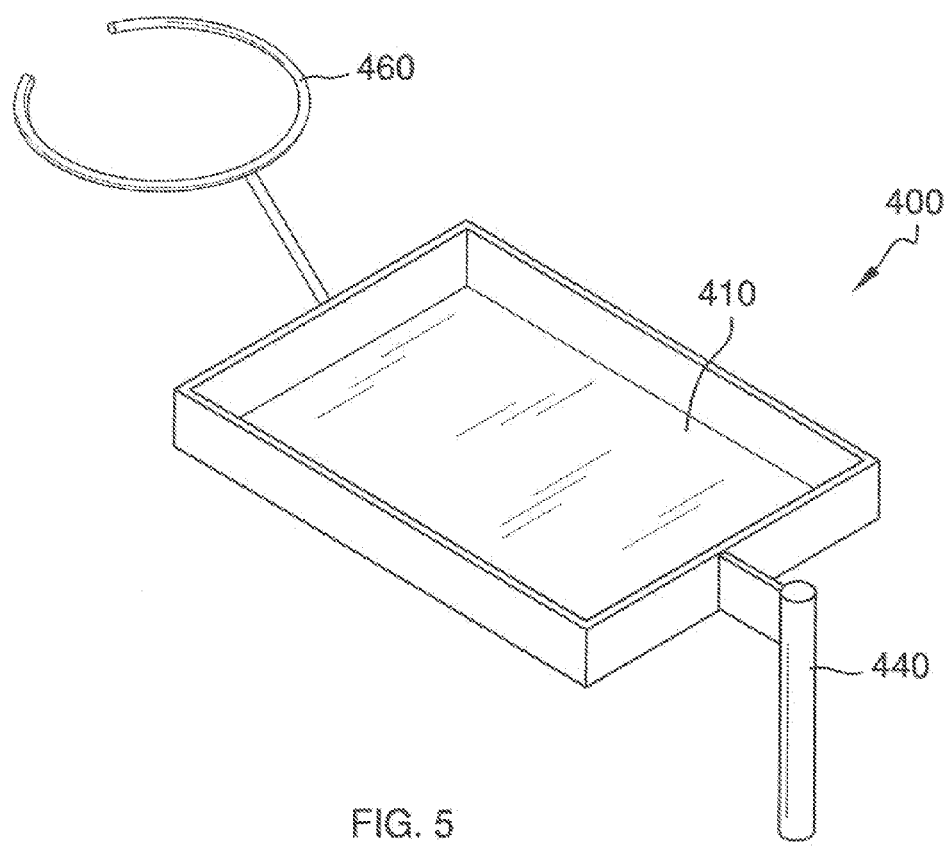
FIG. 5 is a perspective view of the paint tray of the support stand system of the present invention.

Referring now to FIG. 5, the support stand system of the present invention further comprises a paint tray 400. The paint tray 400 comprises a paint pan 410. A mounting rod is disposed on a first side of the paint pan 410, which is adapted to engage a paint tray-mounting component 430. The paint tray mounting component 430 may be disposed on other components of the support stand system. For example, a paint tray-mounting component 430 may be disposed on other components of the system (e.g., door stand 400, fender stand 300, etc.). A ring 460 is disposed on the second side of the paint pan 410 (e.g., opposite the mounting rod 440). The ring 460 functions to hold a paint gun, a roll of tape, or other object the user desires.

Accessory Cart and Sawhorse

Figure 6:
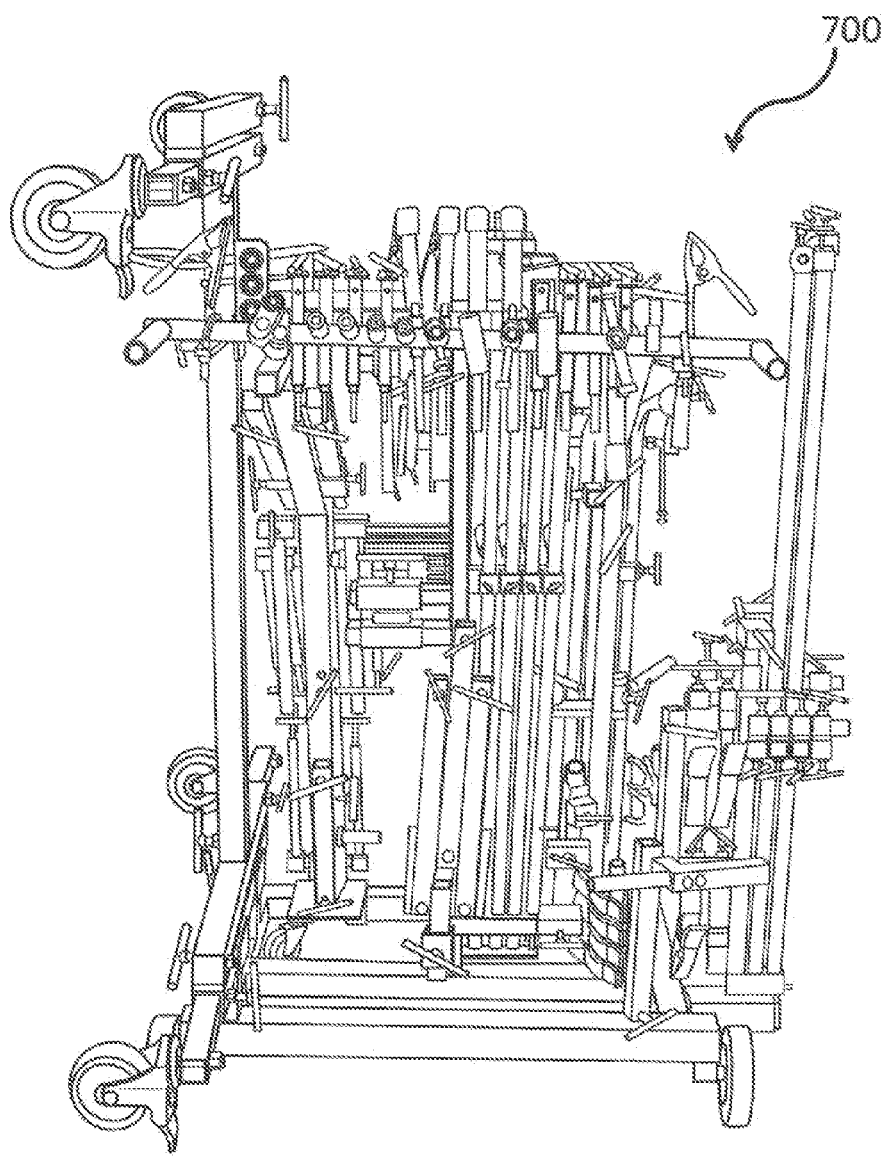
FIG. 6 is a perspective view of an accessory holding cart.
Figure 7:
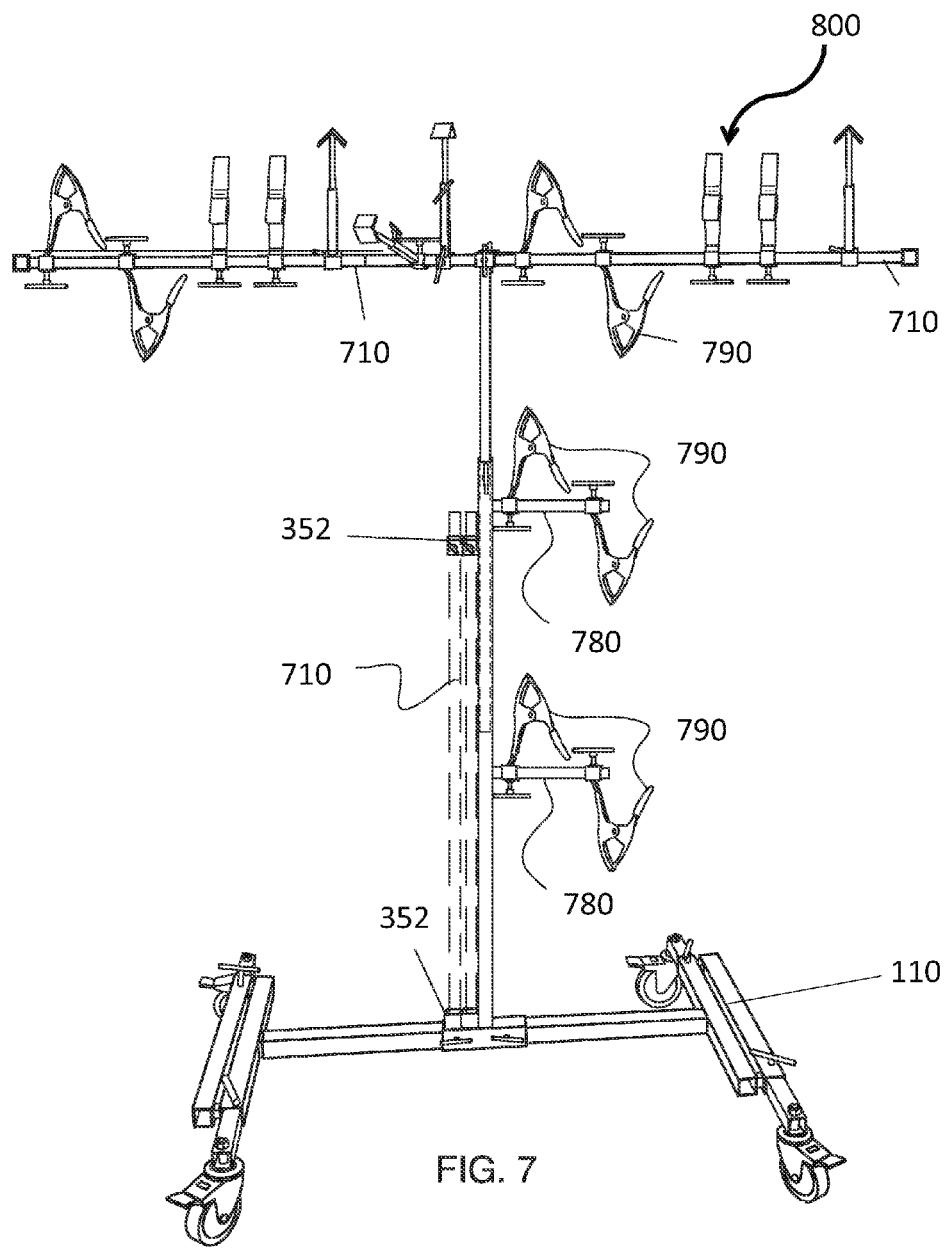
FIG. 7 is a perspective view of a sawhorse stand with clamps.

Referring now to FIG. 6, the support stand system of the present invention may further comprise an accessory cart 700. Referring now to FIG. 7, the support stand system of the present invention may further comprise a sawhorse 800. In some embodiments, the support stand system may further comprise an assortment of interlocking components and clamps. The support stand system may be constructed from a variety of materials. For example, in some embodiments, the support stand system is constructed from materials comprising steel. As shown in FIG. 7, various spring clamps 780 are attached to clamp mounts 790 disposed on a clamp frame 710 atop the main base 110.

The following the disclosures of the following U.S. Patents are incorporated in their entirety by reference herein: U.S. Pat. No. 7,448,606; U.S. Pat. No. 6,409,128; U.S. Pat. No. 6,729,632; U.S. Pat. No. 6,024,348; U.S. Pat. No. 5,707,450; U.S. Pat. No. 5,141,211; U.S. Pat. No. 2,827,690; U.S. Pat. No. 5,296,030; U.S. Pat. No. 5,660,637.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A support stand system for supporting parts of automobiles, said support stand system comprising a generally H-shaped main base comprising a first half base and a second half base connected by a center shaft, the first half base and second half base being generally parallel to each other and perpendicular to the center shaft, the main base mounted atop a plurality of wheels; and one or more of the following:
   (a) a bumper stand comprising:
      (i) a first vertical support shaft having a first end and a second end, the first vertical support shaft is removably attached to the main base via a first mounting clamp disposed on the second end;
      (ii) a T bar removably attached to the first end of the first vertical support shaft via a first T bar brace;
      (iii) an extension bar disposed on the first vertical support bar extending from the first end such that the extension bar is at an angle with respect to the first vertical support shaft;
      (iv) a second vertical support shaft attached to the first vertical support shaft parallel to the first vertical support shaft via one or more bumper stand mounting clamps;
      (v) a first swivel component disposed in the first vertical support shaft, the first swivel component allows the first vertical support shaft to rotate;
      (vi) a paint mounting clamp disposed on the first vertical support shaft, the paint mounting clamp is adapted to removably engage a paint tray; and
      (vii) a bumper arm removably attachable to the first vertical support shaft, a first end of the bumper arm curves away from the first vertical support shaft, wherein a clamp device is disposed on the first end of the bumper arm via a clamp device mount;
   (b) a fender stand comprising:
      (i) a first vertical arm having a first end and a second end, the first vertical arm is removably attached to the main base via a second mounting clamp disposed on the second end;
      (ii) a second vertical arm disposed on the first vertical arm parallel to the first vertical arm via one or more first arm clamps, wherein a first end of the second vertical arm extends above the first end of the first vertical arm;
      (iii) an extension bar disposed on the first end of the first vertical arm extending from the first end such that the extension bar is at an angle with respect to the first vertical arm;
      (iv) a paint mounting clamp disposed on the first vertical arm, the paint mounting clamp is adapted to removably engage a paint tray;
      (v) one or more removable fender arms removably attached to a fender arm mount disposed on the first vertical arm, wherein each fender arm has a mounting end that is adapted to engage the first end of the second vertical arm; and
(vi) a handle disposed on the first vertical arm or the second vertical arm;
(c) a door stand comprising:
(i) a first vertical bar having a first end and a second end, the first vertical bar is removably attached to the main base via a third mounting clamp disposed on the second end;
(ii) a paint mounting clamp disposed on the first vertical bar, the paint mounting clamp is adapted to removably engage a paint tray;
(iii) a handle disposed on the first vertical bar; and
(iv) a bearing mounting arm disposed on the first end of the first vertical bar; and
(d) a paint tray comprising;
(i) a paint pan;
(ii) a mounting rod disposed on a first side of the paint pan, the mounting rod is adapted to engage a paint tray mounting component of the bumper stand, fender stand, and door stand; and
(iii) a ring disposed on a second side of the paint pan.

2. The support stand system of claim 1, wherein the wheels of the main base are caster wheels.

3. The support stand system of claim 1, wherein the main base is expandable.

4. The support stand system of claim 1, wherein the first half base comprises an outer bar and an inner bar that are both generally parallel to each other and generally perpendicular to the center shaft.

5. The support stand system of claim 1, wherein the second half base comprises an outer bar and an inner bar that are both generally parallel to each other and generally perpendicular to the center shaft.

6. The support stand system of claim 1, wherein the first vertical support shaft of the bumper stand is adjustable in length.

7. The support stand system of claim 1, wherein the extension bar of the bumper stand is adjustable in length.

8. The support stand system of claim 1 further comprising a first pipe disposed on an outer end of the extension bar of the bumper stand.

9. The support stand system of claim 1 further comprising a second pipe disposed on the second vertical support shaft of the bumper stand, wherein the second pipe can swivel up and down.

10. The support stand system of claim 1, wherein the first vertical arm of the fender stand is adjustable in length.

11. The support stand system of claim 1 further comprising a rotating arm disposed on an outer end of the extension bar of the fender stand.

12. The support stand system of claim 1, wherein the extension bar of the fender stand is pivotally attached to the first vertical arm via a first pivot component.

13. The support stand system of claim 1, wherein the first vertical bar of the door stand is adjustable in length.

14. The support stand system of claim 1 further comprising a release handle for bearings disposed on a first end of the bearing mounting arm.

15. The support stand system of claim 1 further comprising a rotation bearing disposed on a second end of the bearing mounting arm.

16. The support stand system of claim 15 further comprising a secondary arm with a door and hood mount disposed on the rotation bearing.

* * * * *